US010435640B2

(12) United States Patent
Gronn

(10) Patent No.: US 10,435,640 B2
(45) Date of Patent: Oct. 8, 2019

(54) WOOD PROCESSING METHOD

(71) Applicant: GLOMMEN TECHNOLOGY AS, Elverum (NO)

(72) Inventor: Arne Johannes Gronn, Hernes (NO)

(73) Assignee: GLOMMEN TECHNOLOGY AS (NO)

( * ) Notice: Subject to any disclaimer, the term of this patent is extended or adjusted under 35 U.S.C. 154(b) by 0 days.

(21) Appl. No.: 15/316,347

(22) PCT Filed: Jun. 5, 2015

(86) PCT No.: PCT/EP2015/062624
§ 371 (c)(1),
(2) Date: Dec. 6, 2016

(87) PCT Pub. No.: WO2015/185751
PCT Pub. Date: Dec. 10, 2015

(65) Prior Publication Data
US 2018/0072960 A1    Mar. 15, 2018

(30) Foreign Application Priority Data
Jun. 6, 2014    (GB) .................................. 1410101.8

(51) Int. Cl.
*C10L 5/36*    (2006.01)
*C10L 1/32*    (2006.01)
(Continued)

(52) U.S. Cl.
CPC ................. *C10L 5/363* (2013.01); *C10L 1/32* (2013.01); *C10L 5/442* (2013.01); *C10L 9/086* (2013.01);
(Continued)

(58) Field of Classification Search
CPC combination set(s) only.
See application file for complete search history.

(56) References Cited

U.S. PATENT DOCUMENTS

| 8,518,672 B2 | 8/2013 | Retsina et al. |
| 2004/0159042 A1* | 8/2004 | Murcia .................. C10L 5/361 44/500 |

(Continued)

FOREIGN PATENT DOCUMENTS

WO    2006/006863 A1    1/2006

OTHER PUBLICATIONS

International Search Report and Written Opinion in International Application No. PCT/EP2015/062624, dated Nov. 10, 2015.

*Primary Examiner* — Ellen M McAvoy
*Assistant Examiner* — Chantel L Graham
(74) *Attorney, Agent, or Firm* — J.A. Lindeman & Co., PLLC

(57) ABSTRACT

The invention provides a method for generating a solid wood-based material and a hemicellulose-derived material from a wood raw material, said method comprising; i) treating the wood raw material under aqueous conditions at elevated temperature and pressure whereby to generate a hemicellulose-containing fluid component and a solid component; ii) separating said fluid component from said solid component; iii) processing at least a part of said solid component into a solid wood-based material; and iv) processing said liquid component into a hemicellulose-derived material. The invention also provides for a wood-derived fuel with a low ash content.

18 Claims, 4 Drawing Sheets

Schematic of an Example method

(51) Int. Cl.
*C10L 5/44* (2006.01)
*C10L 9/08* (2006.01)

(52) U.S. Cl.
CPC ..... *C10L 2250/02* (2013.01); *C10L 2290/148* (2013.01); *C10L 2290/30* (2013.01); *C10L 2290/54* (2013.01); *C10L 2290/544* (2013.01); *C10L 2290/545* (2013.01); *C10L 2290/56* (2013.01); *Y02E 50/10* (2013.01); *Y02E 50/30* (2013.01)

(56) References Cited

U.S. PATENT DOCUMENTS

| | | | |
|---|---|---|---|
| 2006/0093713 A1* | 5/2006 | Jurkovich | A23N 17/005 426/511 |
| 2011/0129886 A1 | 6/2011 | Howard et al. | |
| 2011/0263004 A1* | 10/2011 | Ilvesniemi | D21C 5/00 435/274 |
| 2011/0302832 A1 | 12/2011 | Gronn | |
| 2012/0282465 A1* | 11/2012 | Kadam | C08H 6/00 428/402 |
| 2013/0244291 A1* | 9/2013 | Retsina | C13K 13/007 435/99 |
| 2013/0309728 A1 | 11/2013 | Retsina et al. | |

* cited by examiner

Figure 2 – Micrographs of the wood particles of the present invention.

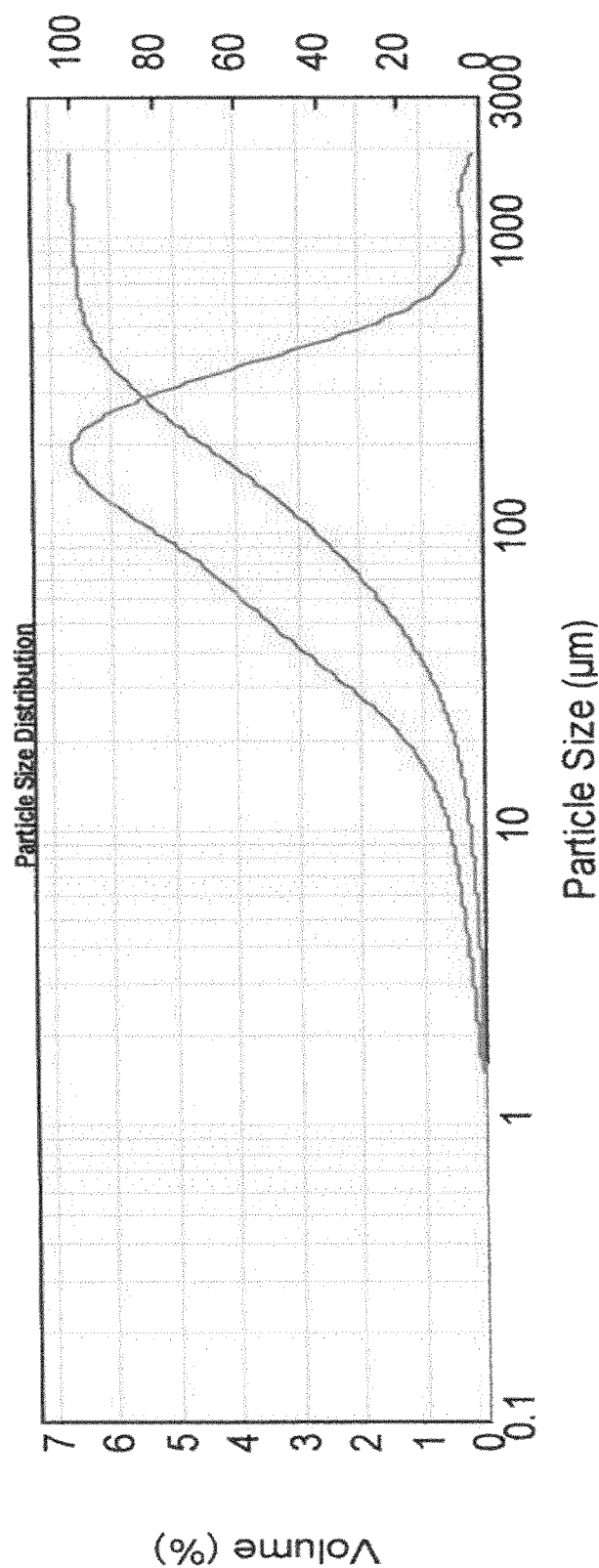
Figure 3 – particle size Distribution as measured by laser scattering

WOOD PROCESSING METHOD

The present invention relates to the generation of fuels and other valuable materials from a wood raw material.

BACKGROUND—WOOD PELLETS

Wood fuel has always been important. Today advanced wood fuel in the form of pellets is an alternative to fossil fuels. A broad range of furnaces can be modified to use wood pellets instead of coal. For a significant part of such furnaces, the wood fuel is burnt as powder. The powder is obtained by milling wood pellets, but can also be made just by milling dry wood.

Most wood pellets are so-called "white pellets", which is made from wood that has been dried to about 10% moisture, grinded, and compressed in pellets mills to pellets of typically 6 or 8 mm diameter, lengths typically from 5-20 mm. These pellets return to the form as wood powder if exposed to water, which is a disadvantage. There is great interest in finding a way to produce hydrophobic wood pellets.

Torrified pellets is one solution for hydrophobic wood pellets. Another solution is pellets made from wood which has been steam exploded. Such pellets are also to a large degree hydrophobic, but not totally.

As the quantity of wood being used as raw material for wood pellets increases, the costs of raw materials may rise. While sawdust used to be the main raw material for wood pellets, today ordinary cellulose chips and pulpwood are being used as raw material for wood pellets. This requires that the use of the wood be done in a way to get the most value out of it.

The present invention represents a way to get increased value for the wood. This is done by separating the hemicellulose from those parts of the wood going to be pelletized, and using the hemicellulose for other products. Furthermore, the resulting material may have additional properties which improve its suitability for uses such as fuels.

BACKGROUND—THE PRESENT INVENTION

Prior art concerning making wood pellets from wood that has been steam exploded is described in BRUSLETTO (WO/2006/006863A1), GRØNN (U520110302832 A1), and HARRIS (U520110296748 A1). These patents describe various methods for treatment of the wood with steam before making pellets.

Although previous methods are effective in the formation of wood pellets, it would evidently be a considerable advantage to generate additional value from the raw material during the production of wood pellets. Contrary to previous methods, the present inventors have now established that by appropriate separation and processing procedures, wood raw material can be separated into high-energy components for the formation of fuel and high-value components for additional uses. The methods of the invention may also provide other advantages, particularly to the fuel material.

In the present invention, hemicellulose is extracted from the wood. Thereafter, the hemicellulose is processed further for uses other than being a component of wood pellets. The remaining components of the wood, mainly consisting of cellulose and lignin, are made to wood pellets, or wood powder fuel, or other products.

In a first aspect, the present invention therefore provides a method for generating a solid, wood-based material (such as a fuel material) and a hemicellulose-derived material from a wood raw material, said method comprising;

i) treating the wood raw material under aqueous conditions at elevated temperature and pressure whereby to generate a hemicellulose-containing fluid component and a solid component;

ii) separating said fluid component from said solid component;

iii) processing at least a part of said solid component into solid, wood-based material (e.g. a fuel); and iv) processing said liquid component into a hemicellulose-derived material.

The main components of wood are cellulose, lignin and hemicellulose, of which cellulose is the largest component. The percentage distribution varies with the wood species. The energy density of these main components are very different. While cellulose has an energy density not far from the average energy density in the wood, the lignin has an energy density per weight unit significantly above that. The hemicellulose has an energy density per weight unit significantly lower than the average for wood. The approximate energy content of lignin is about 27 MJ/kg, for cellulose about 18 MJ/kg and for hemicellulose below 15 MJ/kg. Removal of hemicellulose thus increases the energy density of the remainder.

By separating the (lower energy density) hemicellulose from the rest of the wood (e.g. before pelletizing), we therefore increase the energy density in the fuel (e.g. fuel pellets or fuel powder) made from the remaining parts of the wood. If we then can use the hemicellulose for products with better value than as being part of a wood fuel (or wood pellets), then we have increased the total value of the wood.

Most of the ash content in the wood becomes water soluble after the steam treatment. The method of the present invention thus serves to dissolve the water soluble part of the ash, which is then removed from the solids fraction, and thus from the final solid wood-based material product. The fuel product therefore has a very low ash content, compared to other wood-based fuels. The ash content of the solid wood fraction is observed to be even lower than in heavy oil fuel. It can therefore be used in combustion equipment designed for oil or gas fuels, which generally cannot be used for ordinary wood fuels, and even in combustion equipment without ash handling.

In one embodiment, appropriate to all aspects of the present invention, the solid wood-based material is a fuel with an ash content of no more that 0.25% by weight. Preferably this solid wood-based material will have an ash content of no more than 0.15 wt % (which is the maximum amount of ash permitted in heavy fuel oil), more preferably no more than 0.1 wt % and most preferably no more than 0.08%, 0.06%, 0.05%, or 0.04 wt %. Most preferably, the solid wood-based material will be a fuel (e.g. fuel pellets or fuel powder) with an ash content as indicated, and most preferably no more than 0.3% by weight. Wood derived fuels with an ash content below 0.25 wt % are not generally available and thus in a further aspect, the present invention provides a wood fuel (e.g. a wood fuel pellet or a wood fuel powder) having an ash content as indicated herein.

BRIEF DESCRIPTION OF THE FIGURES

FIG. 3 shows the particle size distribution of wood particles of the present invention as measured by laser scattering using a Malvern Mastersizer 2000 laser scattering instrument.

DETAILED DESCRIPTION OF THE INVENTION

Figure 1:
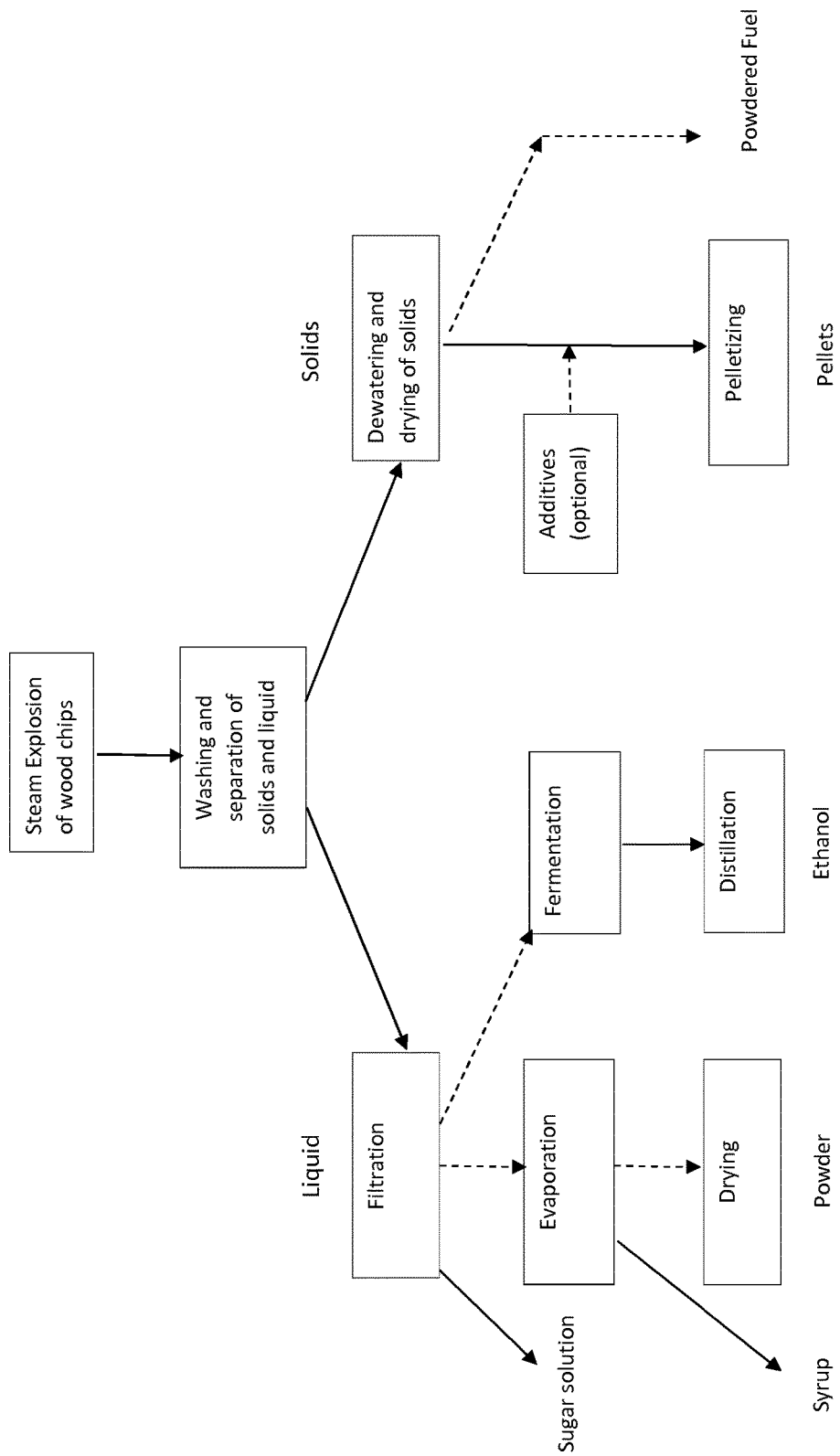
FIG. 1 shows a schematic representation of an example method of the present invention.

The main elements of one key embodiment of the method according to the present invention are illustrated in the diagram of FIG. 1.

In FIG. 1, it can be seen that the method typically begins with steam treatment (steam explosion) of wood chips. This serves several functions, as discussed herein including helping to liberate the hemicellulose and/or helping to solubilise the ash content. The second step of the Example method then separates the hemicellulose from the cellulose and lignin by washing and phase separation. The liquid phase is then filtered and used to generate a sugar solution, a syrup or a sugar-containing powder or is fermented and optionally distilled to generate ethanol. The solid component is at least partially dried and used to generate solid materials such as fuels. The fuels may be in the form of pellets as illustrated in FIG. 1 or may equally advantageously be in other forms such as a powder (as discussed herein).

Previous methods of separating hemicellulose from wood have been described, for example by RETSINA (U.S. Pat. No. 8,518,672B2, US20130244291A1, US20130309728A1). Retsina does not, however, use the present method or relate to the current advantageous combination of a fuel-generating method and a hemicellulose-product generating method.

Steam Treatment (Steam Explosion)

The first step is steam treatment (also called steam explosion) of wood. Both terms steam explosion and steam treatment will be used interchangeably in the following text, with the same meaning. The wood may be hardwood or softwood, in the form or woodchips or smaller particles. The wood can have natural moisture, or being more or less dried.

The main parameters for the steam explosion are:
Temperature 150-230° C. (e.g. 180 to 230° C.)
Temperature reached by injection of steam into a pressure vessel containing wood
Cooking time 120-1200 seconds The temperature is reached by injecting steam into a pressure vessel containing wood. If the steam is saturated, the pressure and temperature will follow a defined path. If the steam is super-heated, then the pressure will be lower at a given temperature than if the steam is saturated.

Preferred cooking time for hardwood is 120-720 seconds at temperature in the range of 195-215° C. Preferred cooking time for softwood is 180-600 seconds at temperature in the range of 200-212° C.

The pressure release at the end of the steam treatment cycle is done in one or more (e.g. at least two) steps. The pressure may first be reduced by releasing steam to another vessel without blowing out any significant quantity of wood particles. Thereafter the pressure is released and going to ambient by blowing out the remaining steam and wood in one blow. Alternatively, the pressure may be released in a single step.

The lower the cooking temperature, then the longer cooking time is needed in order to process the wood. These process parameters must be adjusted according to which wood species are being processed. The particle size and moisture content also influences the optimal parameters.

Optimal parameters are those parameters that lead to the highest yield in extraction of hemicellulose, without reducing the quality for the following steps of the solids and liquid fractions.

In one variant, some of the pressure is reduced by injecting water into the pressure vessel. The processed wood will then be in the form of a slurry when the vessel is emptied, and the slurry goes to a washing and separation step The wood raw material used in the methods of the present invention may comprise hardwood, softwood or a mixture thereof. The material will generally be in the form of pieces, such as chips, dust or other particles. Typical particle sizes will range in largest dimension from around 10 cm to around 1 mm.

Washing and Separation of Solids and Liquid

The hemicellulose becomes water soluble when being exposed to steam treatment (steam explosion), something that is well known. The second step comprises washing and separation of the solids and liquid fractions. During this, the hemicellulose is extracted from the wood, and is in the solution. The washing step may also serve to remove at least a part of the ash content which may be rendered soluble by the steam treatment step.

In some variants, after washing, but before separation, enzymes enabling hydrolysis of part of the cellulose is added, and the separation may be delayed by up to 36 hours while hydrolysis takes place. In this variant, parts of the cellulose will be converted to glucose, and become water-soluble.

In some variants, the separation takes place by using for example dewatering screws that bring the moisture level in the solids fraction below 50% moisture on a wet basis.

Dewatering and Drying of Solids

This step comprises a drying step, for which a broad range of dryer types can be used. This step may also comprise mechanical dewatering, for example by dewatering screw, before the use of a dryer.

Ash Content

Most of the ash content is rendered soluble by the method of the present invention and is removed by the washing step. The solid component thus has a very low ash content, which may be less than 0.15%, or even less than 0.1, 0.08, 0.07 or 0.05%. Even lower ash contents are achievable as indicated herein.

As a consequence of the low ash content, the solid component is compatible with ash requirements for traditional gas turbines, or the powdered solid component can be mixed with liquid hydrocarbons in liquid fuel burners. The present invention thus additionally provides for a fuel, for example a gaseous or liquid fuel comprising wood particles having a very low ash content as described herein. Such wood particles may be formed or formable by the methods described herein. Such a fuel may be a gaseous fuel in which wood particles such as the solid component described herein are suspended in a fuel gas (e.g. methane), an oxidising gas (e.g. oxygen or air) or an inert gas (e.g nitrogen). Similarly, such a fuel may be a liquid fuel in which wood particles such as the solid component described herein are suspended in a fuel liquid (e.g. a liquid hydrocarbon or hydrocarbon mixture such as fuel oil).

Solid Component Fuel

A further advantage of the method of the present invention is that the resulting particles of solid component (also referred to herein as wood particles) may have a very favourable size and/or size distribution. It has been observed that the powder produced through this process has a fine granulometry with the smallest dimension of at least 80% (preferably at least 90%) of the particles being less than 250 µm (e.g. as measured by microscopy). Generally the smallest dimension will be less than 200 µm in 80% or preferably 90% of particles (by number) and most preferably less than 150 µm. The particles are typically asymmetric as a result of the grain in the wood raw material and generally have one longer dimension and two smaller dimensions. Without being bound by theory, the advantageous combustion properties are at least partially attributed to the particles being small in their smallest dimension, as indicated herein, because the combustion front will progress through the smallest dimension. Wood particles of the present invention may thus show immediate and full combustion where powders with larger particles can sometimes show non-burnt particles. This measurement of smallest dimension may be made effectively by microscopy (see FIG. 2).

Given this small granulometry, and provided the low ash content described above, The powder form of the solid component fuel can directly be used in gas turbines and/or fuel burners (mixed with liquid fuel) without customisation of the turbine/burner. This provides very valuable flexibility for feeding burners.

Figure 2:
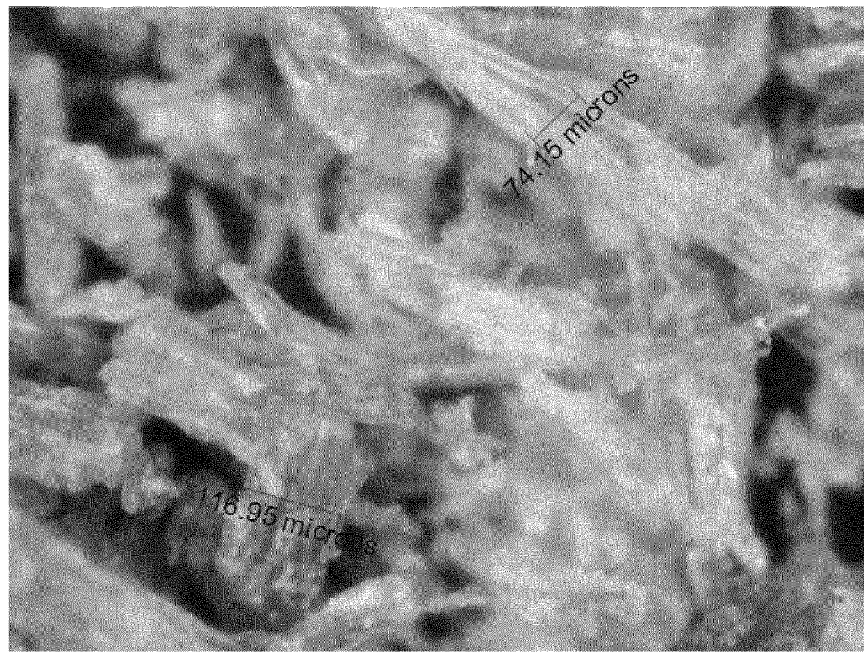
FIG. 2 shows four micrographs a) to d) each showing particles generated by the method of the present invention. Smallest dimensions of some of the larger particles are shown in microns (μm).
Figure 2:
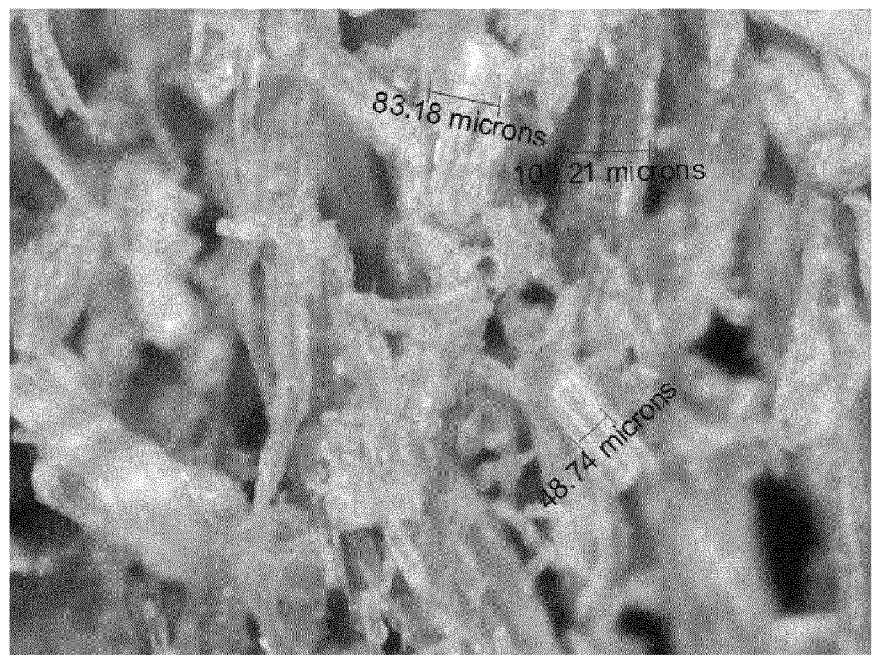
Figure 2:
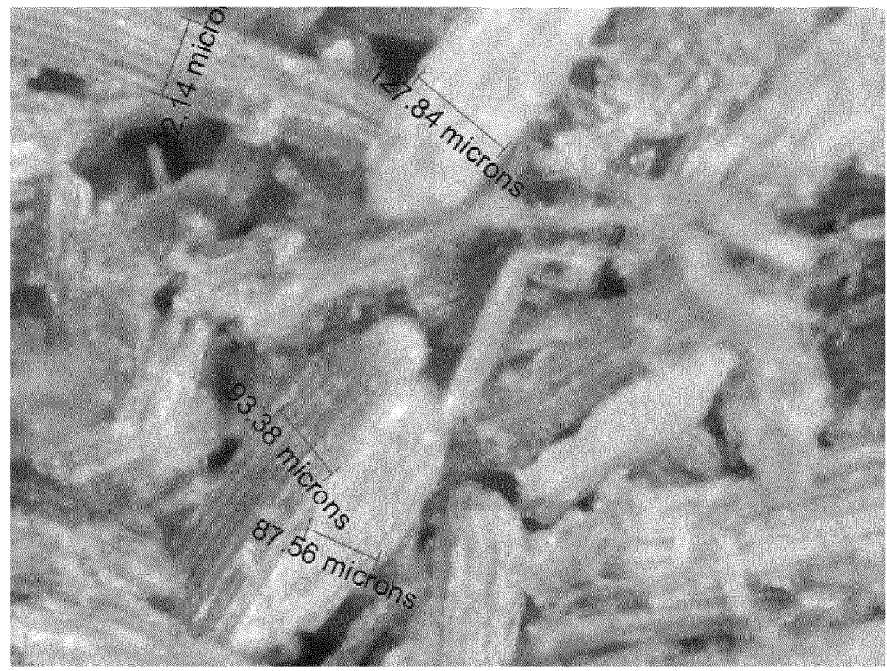
Figure 2:
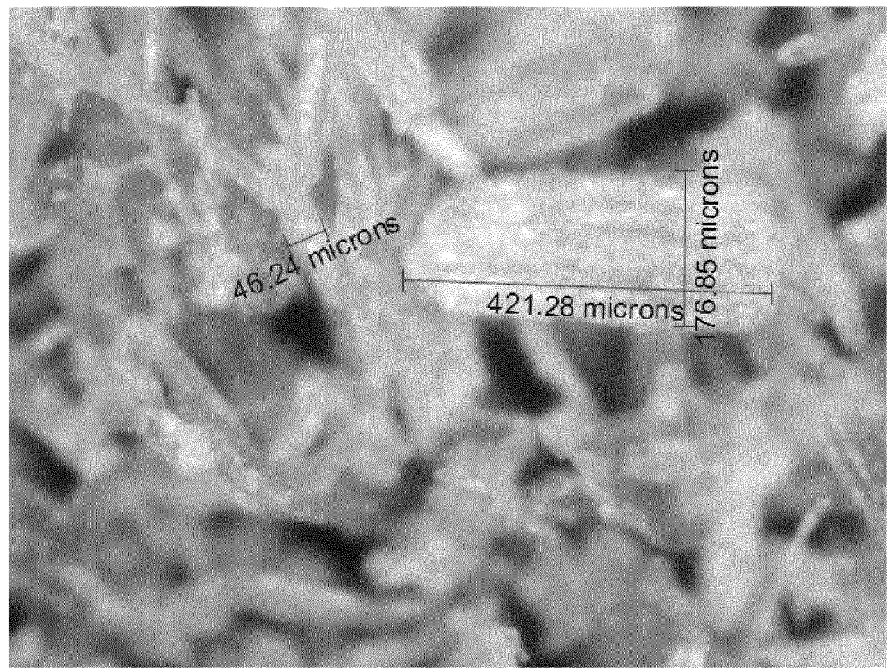

FIG. 2 a) to d) shows micrographs of the typical wood particles formed by the method of the present invention with dimensions illustrated in micrometers (microns). It can be seen that only the larger particles are measured and these generally have a smallest dimension below 250 µm and often still smaller.

Particle sizes were also measured using a Malvern Mastersizer 2000 laser scattering instrument, a typical result from which is illustrated in FIG. 3. It can be seen that by volume %, around 90% of the sample is less than 400 µm, but this laser scattering instrument does not effectively measure the smallest dimension, which is the most relevant dimension in the present context. Correspondingly, when measured by laser scattering, the largest or average dimension is likely to be more closely represented then the smallest dimension. The larger particles may also be over-represented due to the nature of the instrument and the tendency of fibrous particles to agglomerate.

Thus, in a related embodiment, the wood particles of the present invention may be such that at least 60% by volume have a particle size below 250 µm when measured by laser scattering.

Optional Additives

Optional additives are of different types. One type is substances rich in fat or oil, which will improve energy content, binding and hydrophobic properties of the pellets.

Another type of additive is carbon rich substances that increases the energy content and the fixed carbon in the solids (e.g. pellets). Among such substances are coal and charcoal dust. Pellets made with these additives may be used as reducing agents in the metallurgical industry.

Pelletizing of Dried Solids

Due to low or none content of hemicellulose, the properties relevant for pelletizing are different from steam exploded wood. Hemicellulose is to some extent a binder if present during pelletizing. To get just as good binding properties for steam exploded wood from which the hemicellulose has been separated, the cooking time during the steam explosion must be long enough, or the temperature in the die during compression to pellets must be higher, or additives rich in fat or oil might be used.

As hemicellulose is water soluble, the absence of hemicellulose increases the hydrophobic properties of pellets.

In an alternative embodiment, the dried solids may be formed into any solid material, such as a construction material for structural and/or decorative uses. Such construction materials will be well known in the art and include beams, sheets, boards, mouldings etc. The formation of such materials may be by well-known techniques and may optionally incorporate a binder such as a resin binder.

Enzyme Treatment

The solid component or fraction in the methods of the present invention may at any suitable stage be treated in order to cause partial hydrolysis of the cellulose. This may, for example occur after a steam explosion step, or after separation of the solid component from the fluid component. Such hydrolysis will typically be carried out for a period of 1 to 72 hours, particularly 1 to 36 hours and will be followed by a separation step. The solid component from that separation will then be processed into a solid material as described herein and the liquid may be treated separately or may be combined with the hemicellulose-containing fraction and treated with that fraction. Typically the hydrolysed fraction will be processed into similar products as described herein with regard to the hemicellulose fraction, such as sugar solution, syrup, sugar-containing powder and/or fermentation products (e.g. ethanol, methanol, acetic acid etc).

Filtration

Filtration may be carried out in any number of steps, typically proceeding from most course filtration to most fine filtration. A single separation step may be used but generally at least two separation steps will be needed; a first to remove suspended material and a second (nano- or ultra-filtration) to increase the concentration of dissolved material. Multiple steps including increasingly fine filtration steps and/or a plurality of ultrafiltration steps may be used depending upon the nature of the fluid component and the final product.

The first filtration step is in order to remove fibres and other particles. The last step is nanofiltration or ultrafiltration, which serves several purposes:
- One purpose is to concentrate the liquid in a cost efficient way to 20-30% solid consistency
- Some inhibitors to fermentation will be removed during such filtration,
- The taste of the remaining hemicellulose rich solution improves with such filtration, as the taste becomes less bitter After filtration, we have a hemicellulose solution with typically 20-30% content of solids, mainly hemicellulose. In softwood, the main part of the hemicellulose is oligosaccharides. Galactoglucomannan is the largest of these in softwood, while it is glucuronoxylan in hardwood.

The hemicellulose from softwood can among other applications be used as feedstock for fermentation and thereafter distillation to ethanol, or as animal feed. Hemicellulose from hardwood is suitable for animal feed, and as feedstock for various products.

The properties of the hemicellulose can be compared to molasses, and sugars from wood is sometimes called "wood molasses".

Optional Evaporation and Drying

A solution with 20-30% hemicellulose may be a commercial product as it is. Optional further processing with evaporation will increase the value due to a higher concentration of the solution. The solution turns into syrup if the percentage of solids are considerably increased through evaporation, as the viscosity increases with the increased percentage of solids.

The hemicellulose solution can be dried to powder using techniques such as spray drying. This form is the most convenient if the product is to be used as animal feed.

Optional Fermentation and Distillation

Fermentation and distillation is an option for hemicellulose from softwood, but not from hardwood unless additional treatment is undertaken.

Since some inhibitors to fermentation are removed during nano- or ultrafiltration, and there is enough monosaccharides present to start the fermentation process, fermentation can be done directly after the filtration steps (particularly in hemicellulose from softwood). But to ensure a higher yield, one option is to have a hydrolysing step after filtration, a step which comprises heat, acids or enzymes. Such a step would further decrease the level of fermentation inhibitors and/or increase the level of monosaccharaides so as to enhance fermentation.

After fermentation, distillation to ethanol can be done. This ethanol falls within the concept of cellulosic bioethanol, the production of which is a priority in several countries.

Various embodiments of the present invention include the following:

1. A method for generating a solid wood-based material and a hemicellulose-derived material from a wood raw material, said method comprising;
   i) treating the wood raw material under aqueous conditions at elevated temperature and pressure whereby to generate a hemicellulose-containing fluid component and a solid component;
   ii) separating said fluid component from said solid component;
   iii) processing at least a part of said solid component into a solid wood-based; and
   iv) processing said liquid component into a hemicellulose-derived material.
2. The method of embodiment 1 wherein the solid wood-based material comprises a fuel, preferably fuel pellets or fuel powder.
3. The method of embodiment 2 wherein said fuel pellets or fuel powder are wood pellets depleted in hemicellulose.
4. The method of embodiment 2 or embodiment 3 wherein said fuel pellets have a higher energy density than whole-wood pellets. Similarly, the fuel powder may have an energy density higher than whole-wood powder and/or pellets.
5. The method of any preceding embodiment wherein said hemicellulose-derived material comprises at least one material selected from; a sugar solution, a syrup, a sugar-containing powder, an aqueous ethanol solution and ethanol.
6. The method of any preceding embodiment wherein said wood raw material comprises wood chips, wood dust, and/or wood particles.
7. The method of any preceding embodiment wherein step i) comprises steam explosion of the wood raw material whereby to generate an exploded wood material and optionally washing said exploded wood material with an aqueous material such as water.
8. The method of embodiment 7 wherein said steam explosion comprises;
   a) introducing the wood raw material into a pressure vessel
   b) heating the wood raw material by injecting steam and keeping the temperature at 150-280° C. for a period of 60-2400 seconds;
   c) reducing the pressure in one or more steps and removing the exploded wood material out of the vessel;
9. The method of any preceding embodiment wherein step ii) comprises;
   d) washing the exploded wood material.
   e) separating the exploded wood material and moisture into a solids fraction comprising most (e.g. greater than 90%) of the solids, and a fluids fraction comprising most (e.g. greater than 70%, preferably greater than 80%) of the liquid;
10. The method of any preceding embodiment wherein step iii) comprises;
    f) dewatering and drying the solids fraction to below 20% moisture whereby to generate said solids component.
11. The method of any preceding embodiment wherein step iv) comprises;
    g) filtration of the fluids fraction in at least two steps;
      I) A first filtration step after which the liquid component is retained; and
      II) A second filtration step comprising ultrafiltration or nanofiltration of said liquid component, in which the concentration of hemicellulose in the filtrate is increased;
    h) Optionally fermenting the filtrate, followed by distillation to ethanol, or
    i) Optionally evaporating the filtrate to a syrup with increased concentration of hemicellulose, and
    j) Optionally drying the said syrup to a powder
12. The method of any preceding embodiment wherein the wood raw material comprises softwood.
13. The method of any preceding embodiment wherein, wherein the wood raw material comprises hardwood.
14. The method of any preceding embodiment wherein at step i) the temperature is 180-230° C. or 195-215° C.
15. The method of embodiment 9 wherein washing is done as counter current washing.
16. The method of any preceding embodiment wherein at least one enzyme enabling hydrolysis of parts of the cellulose is introduced between steps i) and ii) and followed by an incubation period of up to 36 hours before step ii).
17. The method of any preceding embodiment wherein at least one enzyme enabling hydrolysis of parts of the cellulose is introduced between steps ii) and iii) and followed by an incubation period of up to 36 hours before step iii).
18. The method of embodiment 16 or embodiment 17 wherein the hydrolysed cellulose is separated following incubation and optionally processed into a sugar solution, a syrup and/or a sugar-containing powder.
19. The method of embodiment 9, wherein the solid fraction has a moisture content below 50% on wet basis.
20. The method of embodiment 10, wherein the solids fraction is dewatered and dried to below 10% moisture on wet basis.
21. The method of any preceding embodiment wherein in step iii) the solids component is pelletized after adding a carbon rich additive, thereby increasing the fixed C in the pellets.
22. The method of any preceding embodiment wherein in step iii) the solids component is pelletized after adding an additive rich in fat or oil.
23. The method of any preceding embodiment wherein in step iii) at least a part of the solids fraction is compressed into a construction material such as beams, boards, or sheets, optionally after adding binding agents.
24. The method of embodiment 11, wherein the concentration of dissolved material in the filtrate after the last filtration is above 10%.

25. The method of embodiment 11, wherein the concentration of dissolved material in the filtrate after the last filtration is above 20%.
26. The method of embodiment 11, wherein the concentration of dissolved material in the filtrate after the last filtration is above 25%.
27. The process of embodiment 11, wherein the filtrate is hydrolysed by heat, acids or enzymes before the filtrate is optionally fermented.
28. The process of embodiment 8, wherein reduction of the pressure in the pressure vessel is partly done by injecting water into the pressure vessel.
29. The process of embodiment 11, wherein drying of the syrup to powder is done in a spray dryer.

What is claimed:

1. A method for generating a solid wood-based material and a hemicellulose-derived material from a wood raw material, said method comprising:
   i) steam treating, or steam exploding, the wood raw material to generate a hemicellulose-containing fluid component and a solid wood-based component, wherein said steam treating or steam exploding method includes:
      a) introducing the wood raw material into a pressure vessel;
      b) heating the wood raw material by injecting steam and keeping the temperature at 195-230° C. for a period of 60-1200 seconds;
      c) reducing the pressure in one or more steps; and
      d) removing the exploded wood material out of the vessel;
   ii) separating said hemicellulose-containing fluid component from said solid wood-based component;
   iii) processing at least a part of said solid wood-based component into a solid wood-based material; and
   iv) processing said hemicellulose-containing fluid component into a hemicellulose-derived material by filtering the fluids fraction in at least two steps, wherein the filtering includes:
      I) removing particles and/or insoluble material, after which the liquid component is retained; and
      II) ultrafiltration or nanofiltration of said hemicellulose-containing fluid component, in which the concentration of hemicellulose in the filtrate is increased; and
   wherein the concentration of dissolved material in the filtrate after the last filtration is above 10%.

2. The method of claim 1, wherein said solid wood-based material resulting from step iii) comprises a fuel depleted in hemicellulose, and wherein said fuel has a higher energy density than whole-wood.

3. The method of claim 1, wherein said hemicellulose-derived material resulting from step iv) comprises at least one material selected from: a sugar solution, a syrup, a sugar-containing powder, an aqueous ethanol solution and ethanol; and/or wherein said wood raw material comprises wood chips, wood dust, and/or wood particles.

4. The method of claim 1, wherein step i) further comprises washing said steam treated or steam exploded wood raw material with an aqueous material such as water.

5. The method of claim 1, wherein reducing the pressure in the pressure vessel includes injecting water into the pressure vessel.

6. The method of claim 1, wherein step ii) comprises:
   washing the steam treated or steam exploded wood material; and
   separating the steam treated or steam exploded wood material into a solids fraction and a fluids fraction.

7. The method of claim 1, wherein step iii) comprises:
   dewatering and drying the solids fraction to below 20% moisture whereby to generate said solids component.

8. The method of claim 1, wherein step iv) comprises:
   optionally fermenting the filtrate; and
      distilling the fermented filtrate to ethanol, preferably wherein the filtrate is hydrolysed by heat, acids or enzymes before the filtrate is optionally being fermented;
   or
   optionally evaporating the filtrate to a syrup with increased concentration of hemicellulose, and
   optionally drying the syrup to a powder, preferably wherein drying of the syrup to powder includes spray-drying the syrup to powder.

9. The method of claim 1, wherein the wood raw material comprises softwood and/or hardwood.

10. The method of claim 1, wherein at step i) the temperature is 195-215° C.

11. The method of claim 1 further comprising:
   introducing at least one enzyme enabling hydrolysis of parts of the cellulose between steps i) and ii), and incubating the hemicellulose-containing fluid component and the solid wood-based component for up to 36 hours before step ii).

12. The method of claim 6, wherein the solids fraction has a moisture content below 50% on wet basis.

13. The method of claim 7 further comprising:
   dewatering and drying the solids fraction to below 10% moisture on wet basis.

14. The method of claim 1, wherein
   in step iii) the solids component is pelletized after adding a carbon rich additive, thereby increasing the fixed C in the pellets; and/or
   wherein in step iii) the solids component is pelletized after adding an additive rich in fat or oil; and/or
   wherein in step iii) at least a part of the solids fraction is compressed into a construction material such as beams, boards, or sheets, optionally after adding binding agents.

15. The method of claim 8, wherein the concentration of dissolved material in the filtrate after the last filtration is above 25%.

16. The method of claim 1, wherein the solid wood-based component has an ash content of no more than 0.1 wt %.

17. The method of claim 1, wherein the solid wood-based component is in the form of particles in which at least 90% by number have a smallest dimension of less than 150 μm.

18. The method of claim 2, wherein said fuel is fuel pellets with an ash content on dry basis lower than 0.25 wt %.

* * * * *